Patent text

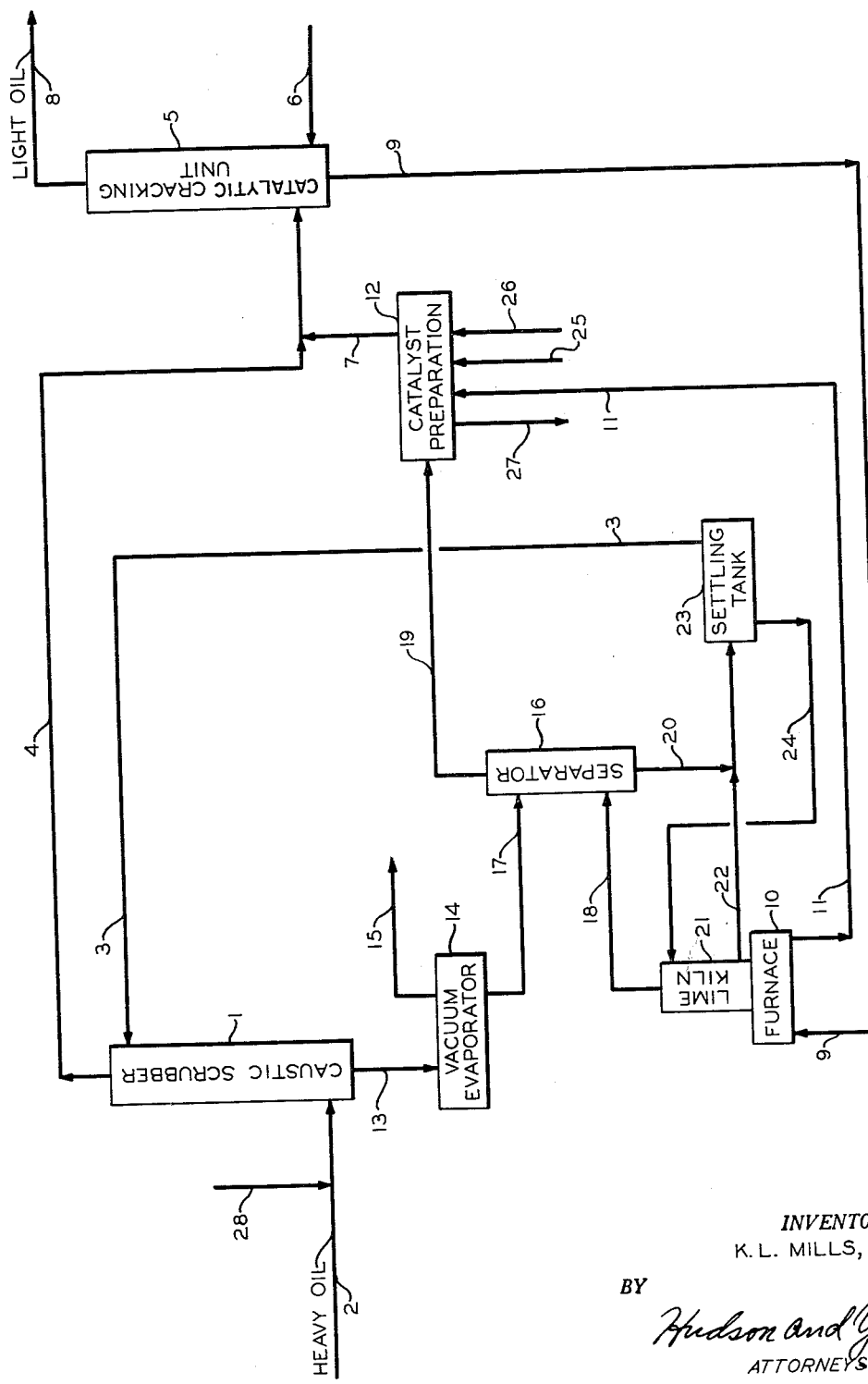

3,131,142
CATALYTIC HYDRO-CRACKING
King L. Mills, Jr., Bartlesville, Okla., assignor to Phillips Petroleum Company, a corporation of Delaware
Filed Oct. 13, 1961, Ser. No. 144,912
1 Claim. (Cl. 208—108)

This invention relates to an improved process for the destructive hydrogenation of heavy oils. In one aspect, this invention relates to the recovery of the metallic portion of the metal catalyst used in hydrocracking processes. In another aspect, this invention relates to the preparation of metal salt catalyst used in hydrocracking processes.

It is well known in the art of refining petroleum that elevation of the temperature of liquid hydrocarbons beyond certain limits results in cracking. It is also well known that metals present in the hydrocarbon tend to increase the rate of cracking. However, when hydrogen is present the temperature, pressure and hydrogen-to-hydrocarbon mole ratio can be established to produce desirable fuel products from heavy oils such as topped crude oils, gas oils, cycle oils, residues of distillation, tars, pitches, shale oils and the like.

One problem connected with the above process resides in providing a homogeneous contacting between the metal particles, hydrogen and the oil to be cracked. One answer appears to be homogeneous dispersion of the metal catalyst in the form of a soluble salt. However, such proposals have met with disfavor in the refining industry because of the high cost of the catalyst which frequently cannot be readily recovered in the process. The process per se is described in copending application Serial No. 81,129, filed January 6, 1961, by King L. Mills, Jr., entitled "Heavy Oil Conversion Process."

I have discovered a process wherein the metallic portion of catalyst used in hydrocracking processes can be recovered and reused.

It is an object of this invention to provide a method of recovering the metallic portion of catalyst used in hydrocracking processes.

Another object of this invention is to provide a method of preparing the metal catalyst used in hydrocracking processes.

Other objects and several advantages of this invention will be apparent to those skilled in the art from a study of the disclosure, drawing and claim.

To more clearly understand this invention, reference is made to the drawing which is a schematic flow diagram illustrating a process in accordance with this invention.

In the drawing, heavy oil containing acidic constituents is passed to caustic scrubber 1 through line 2. Aqueous caustic soda (or other base) solution is passed to caustic scrubber 1 through line 3 and the acidic constituents in the heavy oil react with the caustic solution. Sweetened heavy oil is removed from the caustic scrubber through line 4 and passed to catalytic cracking unit 5. Hydrogen is charged to the catalytic cracking unit through line 6. The metal salt catalyst is mixed with the heavy oil charged to the catalytic cracking unit by way of line 7. The catalytic cracking unit operates at high pressure at elevated temperatures. Cracked light oil is removed from the catalytic cracking unit through line 8 and passed to storage or fractionation vessels not shown. Residue containing the metal salt catalyst is removed from the catalytic cracking unit through line 9 and passed to furnace 10, where it is burned. The ash from furnace 10 is removed through conduit 11 and passed to catalyst preparation zone 12. Spent caustic solution from the caustic scrubber which is rich in the acidic constituents of the heavy oil is withdrawn from caustic scrubber 1 through line 13 and passed to vacuum evapoartor 14 where the volume of the spent caustic solution is reduced by removing volatile materials through line 15. The concentrated spent caustic solution is passed to separator 16 by way of line 17. Carbon dioxide is bubbled through the spent caustic solution in separator 16, causing the acidic constituents to separate from the aqueous solution. The carbon dioxide is added through line 18. The acidic constituents are withdrawn through line 19 and passed to catalyst preparation zone 12 where they are contacted with the metal oxides or ash from furnace 10. The carbon dioxide saturated solution is withdrawn from separator 16 through line 20 and contacted with calcium oxide from lime kiln 21 and withdrawn by way of line 22. The saturated carbon dioxide solution reacts with the calcium oxide forming aqueous caustic solution and a precipitate of calcium carbonate in settling tank 23. The regenerated caustic solution is withdrawn through line 3 and passed to caustic scrubber 1. The calcium carbonate is removed by way of conduit 24 and passed to lime kiln 21 wherein it is heated to produce carbon dioxide and calcium oxide. The catalyst preparation is carried out in catalyst preparation zone 12 by contacting the ash from furnace 10 with the organic acid constituents separated from the aqueous caustic solution. To insure the reaction of the organic acids and metal oxides in the catalyst preparation zone, it is desirable to add dilute mineral acids, such as 5 to 20 percent hydrochloric acid, through line 25 while heating the catalyst preparation zone. The metal salt catalyst precipitates in catalyst preparation zone 12, and can be dissolved in a liquid hydrogen transfer diluent material that is added through line 26. The transfer diluent and the metal salt solution is then withdrawn through line 7 and mixed with the heavy oil charge to the catalytic cracking unit. The catalyst preparation zone can also be equipped with line 27 to withdraw the aqueous mineral acid as it becomes too dilute from the water produced in the reaction between the metal oxides and the organic acid constituents. When the heavy oil is very viscous it may be desirable to add a diluent to the heavy oil feed before it enters caustic scrubber 1 to improve its flow characteristics. This addition can be made by way of line 28.

It will be recognized that the drawing is diagrammatic and the various elements illustrated are not intended necessarily to represent individual processing units such as fractionation towers, etc. but rather represent broad process steps, one or more of which require a number of individual process units. Necessary valves, pumps, burners, etc., are not shown.

Although the process can be carried out as a batch operation, continuous operation is preferred and can be carried out in any suitable vessels known to those skilled in the art.

It will also be recognized that many variations may be made in the process as shown in the drawing without departing from the scope of the invention. For example, the caustic scrubber may be charged with an aqueous solution of any alkali metal hydroxide to remove the acidic constituents in the heavy oil. In localities where carbon dioxide and quick lime are available in commercial quantities, the lime kiln will not be necessary and the furnace of the kiln can be utilized in a steam boiler, gas preheater, reboiler or the like. Ammonia synthesis gas is an excellent source of carbon dioxide when the process is carried out near an ammonia plant. The reaction temperatures in the catalytic cracking unit are in the range of about 650 to 900° F., preferably, in the range of 750 to 860° F. The reaction pressure is in the range of about 500 to 10,000 p.s.i.g. Flow rates in the range of about .01 to 15, preferably 0.5 to 5 liquid volumes per reactor volume per hour are used. The reaction temperature, pressure and flow rates will vary, depending on the type of heavy oil charged and the type of product desired.

The compounds used as catalysts are oil soluble or oil dispersible metal salts of organic acidic constituents. The metals are selected from groups II through VIII of the periodic table. Included in such compounds suitable for the purpose of this invention are metal salts of carboxylic acids and metal salts of phenols. Transition metal salts are preferred over the remainder of the broad class of catalyst compounds. The transition metals are noted in "Organic Chemistry" by Therald Moeller, page 105, Wiley, 1952. Compounds which are particularly desirable as catalyst are naphthenates of the transitional metals. Specifically the more desirable compounds include naphthenates of iron, nickel, cobalt, molybdenum, chromium, tungsten and vanadium. However, compounds of metals other than transition metals can be used and some of these are zinc naphthenate and cadmium naphthenate. Since the catalyst is prepared from the acidic constituents separated from the heavy oil feed stock, it will naturally consist of a mixture of the metal salts corresponding to the various acidic constituents found in the feed stock. In petroleum feed stocks naphthenic acids are the predominant acidic constituents. The amount of catalyst employed is in the range of about 0.1 to 1 weight percent, preferably 0.1 to 0.2 weight percent of the heavy oil charge based on the metal content of the catalyst.

When the feed stock does not contain sufficient acidic constituents to support the desired catalyst level, provision is made to add an acid to the catalyst preparation zone or to add a prepared metal salt catalyst to the catalyst preparation zone. However, in accordance with refinery practice, caustic scrubber units treat various oils, tars, residues and pitches to remove the acidic constituents. The acidic constituents from all of these treatments can be combined and added to the catalyst preparation zone assuring sufficient acidic constituents to maintain the proper catalyst level in the catalytic cracking unit.

The hydrogen that is introduced into the catalytic cracking unit need not be pure hydrogen so long as it contains no deleterious gaseous compounds. Ordinarily the hydrogen is added in an amount of from 1000 to 10,000 cu. ft. per barrel of heavy oil charged depending on the type of oil charged and the type of product desired.

The following example is given to illustrate the invention and is not to be intended to limit the scope or spirit of the invention.

*Example*

In a refinery catalytic cracking unit operating in accordance with this invention and charging 1000 gallons Wafra crude per hour, the nickel naphthenate catalyst is prepared batchwise. Each eight-hour shift a batch of 700 pounds of nickel naphthenate is prepared by dissolving 75 gallons of napthenic acids, removed from a caustic scrubber operation, in 150 gallons of 5 percent hydrochloric acid in an agitated, steam-jacketed, glass-lined autoclave. Steam is introduced into the jacket of the autoclave, and, when the temperature of the acid solution is about 180° F., 210 pounds of ash from a furnace burning cracking residue is charged to the autoclave. The ash has an average nickel content of about 60 weight percent. The autoclave is shut in and the mixture is cooked at approximately 225° F. for two hours after reaching this temperature. The temperature is then reduced to about 210° F., the autoclave is opened and the mixture is thickened by evaporation of about 10 to 20 gallons of the water. The reactor is cooled to about 150° F. and 1000 gallons of tetralin is added. The mixture is agitated until substantially all of the nickel naphthenate has entered the hydrocarbon phase. On separation, the hydrocarbon-nickel naphthenate solution is decanted and the water phase is drained to the sewer for disposal. The hydrocarbon-nickel naphthenate is injected into the cracking charge stream in an amount sufficient to provide 0.2 weight percent nickel, based on the crude charged, during a subsequent eight-hour shift. Residue from the catalytic cracking unit is continuously withdrawn and burned in a furnace to produce approximately 26 pounds of ash per hour. The ash from the furnace is then withdrawn and passed to the catalyst preparation zone described above. The light oil product from the hydrocracking process has an API gravity of 27 as compared to an API gravity of 18.6 of the Wafra crude.

As many possible embodiments can be made of this invention without departing from the scope thereof, it is to be understood that all matter herein set forth is to be interpreted as illustrative and not as unduly limiting the invention.

I claim:

In a process for hydrocracking a hydrocarbon oil by destructive hydrogenation comprising the steps of treating said hydrocarbon oil to be cracked with a caustic to remove the organic acids therefrom, introducing the resulting caustic batch treated hydrocarbon oil as feed into a hydrocracking zone, destructively hydrogenating said hydrocarbon oil in said hydrocracking zone in the presence of a catalyst composed of a metal salt of an organic acid, recovering the hydrocracked oil, removing a hydrocracking residue from said hydrocracking zone and burning said residue to obtain therefrom a metal oxide, the improvement which comprises utilizing as said catalyst a composition formed in situ by introduction of the organic acids removed fro mthe hydrocarbon oil feed, the metal oxide recovered from said hydrocracking zone residue and an inorganic acid into a catalyst forming zone.

References Cited in the file of this patent

UNITED STATES PATENTS

| | | |
|---|---|---|
| 1,500,995 | Jones | July 8, 1924 |
| 2,091,831 | Pongratz et al. | Aug. 31, 1937 |
| 2,467,920 | Voge et al. | Apr. 19, 1949 |
| 2,789,134 | Nelson et al. | Apr. 16, 1951 |

OTHER REFERENCES

"Petroleum Acids and Bases," Lochte et al., pages 19 to 21, Chem. Pub. Company, New York, 1955.